Figure 1:
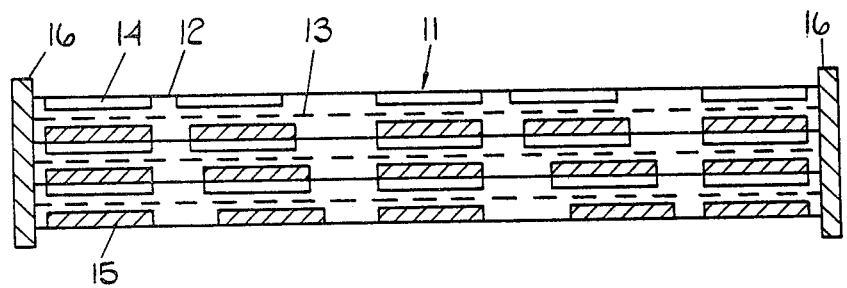

United States Patent [19]

Brown

[11] 4,307,161
[45] Dec. 22, 1981

[54] BATTERY SYSTEMS EMPLOYING BIPOLAR ELECTRODES

[75] Inventor: David J. Brown, Solihull, England

[73] Assignee: Lucas Industries Limited, Birmingham, England

[21] Appl. No.: 185,172

[22] Filed: Sep. 8, 1980

[30] Foreign Application Priority Data

Sep. 12, 1979 [GB] United Kingdom ............... 31634/79

[51] Int. Cl.³ .......................... H01M 2/20; H01M 4/70
[52] U.S. Cl. ..................... 429/120; 429/136; 429/149; 429/153
[58] Field of Search ............... 429/152, 153, 127, 136, 429/210, 149, 131, 120

[56] References Cited

U.S. PATENT DOCUMENTS

| | | | |
|---|---|---|---|
| 2,564,495 | 8/1951 | Mullen | 429/152 |
| 2,727,079 | 12/1955 | Chubb et al. | 429/153 |
| 3,239,380 | 3/1966 | Berchielli | 429/127 |
| 4,051,304 | 9/1977 | Snook | 429/149 |

Primary Examiner—Donald L. Walton
Attorney, Agent, or Firm—Holman & Stern

[57] ABSTRACT

A bipolar system comprises a plurality of flexible, conductive electrode strips assembled into a stack with porous, flexible, insulating separator strips being interposed between adjacent electrode strips. Each electrode strip at the exterior of the stack is provided on its innermost surface with electrochemically active material, and the or each electrode strip in the interior of the stack is provided on each of its opposite major surfaces with electrochemically active material. Sealing means is provided around the ends and lowermost edges of the electrode strips.

The stack of electrode strips and separator strips is folded into a serpentine configuration and then mounted in a generally rectangular battery box such that the serpentine configuration winds back and forth between opposite walls of the box with electrochemically active material of opposite polarity on an adjacent strip.

7 Claims, 3 Drawing Figures

BATTERY SYSTEMS EMPLOYING BIPOLAR ELECTRODES

This invention relates to battery systems employing bipolar electrodes.

In a bipolar electrode, a single conductive substrate is provided on respective major surfaces with layers of electrochemically active material of opposite polarity so that, when the electrode is assembled in a battery, it defines active elements of two adjacent cells. Current transfer between the cells then takes place through the conductive substrate of the electrode instead of, as in a conventional cell, through an intercell connector extending over or through a partition wall separating the two cells.

It has long been recognised that battery systems employing bipolar electrodes have a number of advantages over conventional battery systems. In particular, with a bipolar system, there is a more uniform current density distribution across the electrode, the intercell voltage drop is decreased, the gravimetric and volumetric energy densities are increased as a result of the absence of bulky intercell connectors, and the electrodes are potentially simpler and cheaper to manufacture. Although these advantages apply to all battery systems, bipolar electrodes are particularly advantageous in nickel/zinc and silver/zinc batteries, where it is known that uneven current densities can accelerate shape change of the electrodes and thereby result in decreased cycle life.

In view of the above advantages, considerable research has been conducted into the development of practical bipolar battery systems, but to date this research has been hampered by the problem of intercell sealing. Thus, in a bipolar battery system, it is necessary to completely separate the opposite major surfaces of each bipolar electrode from one another since any electrolyte leakage would cause rapid self-discharge of the electrode and prevent the necessary battery voltage being developed. One possible solution to the sealing problem is to use an adhesive to produce a liquid-tight joint between substantially the whole peripheral edge of each electrode and a suitable battery container. For large batteries this obviously presents an assembly problem in ensuring that satisfactory sealing exists. Moreover, in service, the adhesive join is subjected to repeated expansion and contraction stresses and also must be able to withstand elevated temperatures and strongly oxidising conditions. Moreover, in certain batteries, particularly batteries containing nickel electrodes, heat generated on discharge needs to be conducted rapidly away to prevent high temperatures being developed within the battery and hence a good terminal conductivity is required. In addition, from a practical viewpoint, the adhesive must be of reasonable cost since it is required in large quantity.

In view of the sealing problems, the only area in which bipolar electrodes are at present in common usage is in small battery cells, for example small Leclanche cells. In this case, the lack of a mobile electrolyte means that the sealing problems are not critical.

With a view to overcoming the above-mentioned problems, consideration has previously been given to reducing the amount of sealing required by using the spiral cell configuration commonly employed in small non-bipolar cells. In this prior art case, stacked layers of interleaved positive and negative foil electrodes having separators interposed therebetween, are wound round a central current collector with the outermost convolution of foil being connected to a conductive casing. It will be appreciated that if the foil electrodes are made bipolar, sealing is only required at the open edges of the spiral. However, this construction is unsuitable for use in larger batteries since a large spirally wound electrode would suffer from severe thermal gradients and unacceptably high voltage drops along the conductive carrier. In addition the spirally wound configuration would make it difficult to remove the substantial amounts of heat which would be generated in service. Moreover, in view of space considerations a relatively tight spirally wound configuration is desirable. This means that the electrode materials should be relatively thin, whereas the use of relatively thick electrodes can significantly reduce the costs involved in electrode production.

An object of the present invention is therefore to overcome or alleviate the above-mentioned disadvantages experienced in conventional bipolar battery systems.

Accordingly, the invention resides in a bipolar battery system comprising a generally rectangular battery box, a plurality of flexible, conductive electrode strips stacked with porous, flexible, insulating separator strips interposed between adjacent electrode strips, each electrode strip at the exterior of the stack being provided on its innermost surface with electrochemically active material, and the or each electrode strip in the interior of the stack being provided on each of its opposite major surfaces with electrochemically active material, the stack of electrode strips and separator strips being arranged in the battery box in a serpentine configuration which winds back and forth between opposite walls of the box, with the electrochemically active material on each strip being aligned with electrochemically active material of opposite polarity on an adjacent strip, and sealing means extending around the ends and lowermost edges of the electrode strips.

Employing the system described in the preceding paragraph entrails a significant reduction in the amount of sealing required and hence it is possible to provide relatively thick layers of adhesive in the areas where sealing is necessary, thereby ensuring a better seal. The major area of sealing is at the bottom of the battery box which not only is the easiest to incorporate in a production process, but also does not suffer from quite the same oxidative stresses. In addition having each electrode strip arranged in serpentine form allows distributed connections to be made thereby giving a low voltage drop in the strip. Also the serpentine arrangement aids removal of the generated heat. Further, by using very long electrode strips (eg 20 ft in length), it is possible to produce high current capacity batteries.

Preferably, the electrochemically active material on each strip is provided in the form of a plurality of regions of electrochemically active material spaced along the length of the strip, with the regions of active material on each strip being aligned with respective regions of active material of opposite polarity on an adjacent strip.

Preferably, the spacing of said regions of electrochemically active material and the dimensions of said serpentine configuration are arranged so that all the regions of electrochemically active material are substantially aligned in a single row and extend generally parallel with said opposite walls of the battery box.

Figure 2:
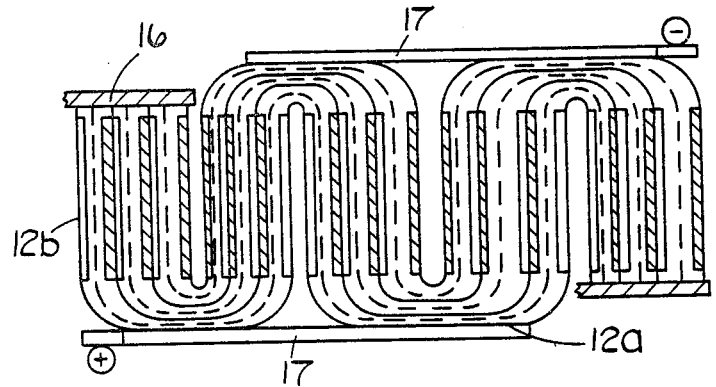
Figure 3:
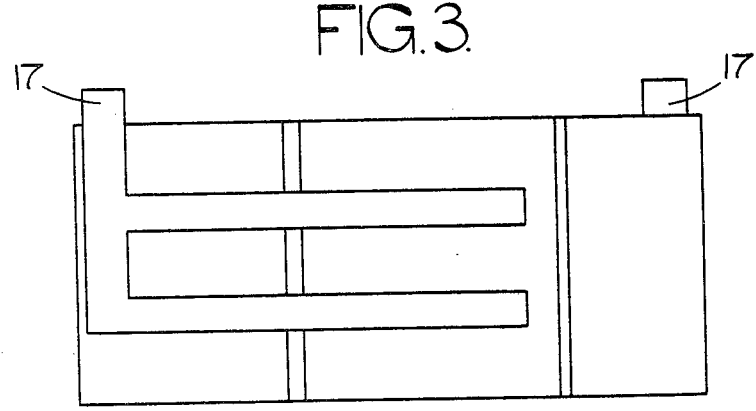

In the accompanying drawings, which illustrate a bipolar battery system according to one example of the invention, FIG. 1 is a sectional view of a stack of electrode strips and separator strips, prior to folding of the stack into a serpentine configuration, FIG. 2 is a plan view of the stack shown in FIG. 1 after folding into a serpentine configuration, and after connection of the terminal members, and FIG. 3 is a side view of FIG. 2.

Referring to the drawings, the invention will now be described with reference to a nickel/zinc battery, but it is to be appreciated that other battery systems, for example nickel/cadmium batteries and lead-acid batteries, could be constructed in a similar way. The system includes a stack 11 of flexible, conductive electrode strips 12 having porous, flexible, insulating separators 13 interposed between adjacent electrode strips 12. Each electrode strip 12 is defined by a length of copper foil, conveniently 5 microns thick, and each strip 12 in the interior of the stack is provided on one major surface with a plurality of spaced nickel hydroxide regions 14 and on its opposite major surface with a plurality of spaced zinc oxide regions 15. In the case of a nickel/cadmium battery the regions 15 would be composed of a cadmium oxide-containing active material. The regions 14, 15 on the opposite major surfaces of each internal electrode strip 12 are aligned but, for the reason which will become apparent below, are not all aligned with the regions 14, 15 on the adjacent strips 12. In the case of the two electrode strips 12 located at the exterior of the stack 11, one of the strips 12 is provided at its innermost surface with a plurality of spaced nickel hydroxide regions 14, while the innermost surface of the other strip 12 is provided with a plurality of spaced zinc regions 15.

To produce the regions 14 on a given strip 12, a thin coating of nickel, typically 10-20 microns thick, is applied to the required surface of the copper foil strip over the whole length of the strip, the strip conveniently being 8 ft in length by 8 inches in width. A paste of nickel hydroxide mixed with graphite and cobalt hydroxide it then extruded onto the nickel coating at spaced intervals along the strip, whereafter the paste is dried and pressed at 5 t.s.i. to a final thickness of about 1 mm. A similar process is used to produce the zinc layers 15, although in this case the active material is a paste containing zinc oxide and graphite which is applied directly to the copper foil and which, after drying, is pressed at 1 t.s.i. again to a final thickness of about 1 mm.

Alternatively, each nickel electrode can be of a sintered type where the sinter is attached to the nickel coating on the respective strip 12 either during the sintering process or by spot welding afterwards.

After production of the layers 14, 15 the resultant electrode strips and the separators 13 are built up into the stack 11. The separator strips are conveniently defined by the non-woven polyamide material sold by Carl Freudenberg as viledon FT2119, which may be assembled as a single layer between adjacent pairs of electrode strips 13. Alternatively, two layers of viledon and one layer of the micro porous polypropylene sold by Celanese Ltd., (United States) as Celgard 3400 may be assembled between each pair of adjacent strips 12. As a further alternative, two layers of viledon and three layers of Celgard 3400 or two layers of viledon and three layers of a cellulosic material such as PUDO 193 sold by Dupon of United States, could be employed.

After stacking, the ends of the strips 12, 13 are encapsulated in a suitable adhesive 16, such as an alkali-resistant epoxy resin adhesive (eg. that supplied by Ciba Geigy as AY105/HT972) or a hot melt adhesive (eg. as supplied by Swift Chemicals), so that the stack 11 then consists of the strips 12, 13 held together by the adhesive layers 16. This is the situation shown in FIG. 1. The stack 11 is then folded into the serpentine configuration shown in FIG. 2 so that the strips include a plurality of fold portions, indicated by the suffix a in FIG. 2, separating a plurality of parallel portions which are indicated by the suffix b and which carry the active regions 14 and/or 15. It will be appreciated that the dimensions of each fold portion 12a will depend upon whether the strip is situated at the outside or the inside of the fold but, by suitable arrangement of the spacing of the layers 14, 15 along their respective strips, the configuration shown in FIG. 2 is achieved in which all the layers 14, 15 are located in the parallel portions 12a and are substantially aligned in a single row.

After folding the stack 11, a respective copper terminal member 17 is secured, conveniently by welding or soldering, to the exposed copper surface of the folded portions 12a of each external strip in the stack. The terminal member 17 secured to the strip 12 carrying the nickel-based active material will then define the positive terminal of the final battery, whereas the member 17 secured to the strip carrying the zinc-based active material will define the negative terminal. Preferably, each terminal member is hollow so that cooling water may be circulated through the terminal members. Using this arrangement, it would be possible not only to achieve effective cooling of the battery, but also to avoid temperature gradients within the battery since the copper foil strips connected to the copper terminal members would act as efficient heat sinks. Conveniently, the cooling water would be circulated by a small electric pump between the battery and an air cooled radiator.

Finally, the folded stack 11 is assembled into a generally rectangular battery box (not shown), which is preferably formed of a thermoplastics material such as polypropylene and which is provided with a thin layer of adhesive extending over its internal base surface. The lowermost edges of the strips 12, 13 are pressed into the adhesive so that, when the adhesive has set, a liquid-tight seal is produced over the lowermost edges of the strips as well as the end seals provided by the adhesive layers 16. The box is then filled with electrolyte under vacuum, whereafter a lid is secured to the top of the box and seals are produced between the terminal members 17 and the lid.

The resultant battery is found to have a minimum volumetric energy density of 150 Wh/liter and the sealing between the electrodes is found to be effective over a long period of time. In the case of a nickel cadmium battery, the minimum volumetric energy density would be 120 Wh/liter.

While in the particular example the active material has been placed on the conductive strips as a plurality of spaced areas, it is possible to arrange the active material in continuous fashion along the strip if it is only up to a few microns in thickness. While this would mean that active material would lie in the fold portions 12a (FIG. 2) this will not interfere with the action of the battery.

As a further alternative to the example described above, in which all the electrode strips 12 are formed of copper foil, the inner strips in the stack 11 could be formed of a conductive synthetic resin material. For the outer current carrying strips 12 a material, such as copper foil, having a high electrical conductivity would again be employed.

I claim:

1. A bipolar battery system comprising a generally rectangular battery box, a plurality of flexible, conductive electrode strips stacked with porous, flexible, insulating separator strips interposed between adjacent electrode strips, each electrode strip at the exterior of the stack being provided on its innermost surface with electrochemically active material, and the or each electrode strip in the interior of the stack being provided on each of its opposite major surfaces with electrochemically active material, the stack of electrode strips and separator strips being arranged in the battery box in a serpentine configuration which winds back and forth between opposite walls of the box, with the electrochemically active material on each strip being aligned with electrochemically active material of opposite polarity on an adjacent strip, and sealing means extending around the ends and lowermost edges of the electrode strips.

2. A system as claimed in claim 1 wherein the electrochemically active material on each strip is provided in the form of a plurality of regions of electrochemically active material spaced along the length of the strip, with the regions of active material on each strip being aligned with respective regions of active material of opposite polarity on an adjacent strip.

3. A system as claimed in claim 2 wherein the spacing of said regions of electrochemically active material and the dimensions of said serpentine configuration are arranged so that all the regions of electrochemically active material are substantially aligned in a single row and extend generally parallel with said opposite walls of the battery box.

4. A system as claimed in claim 1 wherein a respective terminal member is electrically connected to the portions of each outer electrode strip folded to define said serpentine configuration, each terminal member being exposed at the external surface of the battery box.

5. A system as claimed in claim 5 wherein each terminal member is hollow so that, in use, cooling water may be circulated therethrough.

6. A system as claimed in claim 1 wherein the electrochemically active material provided on the innermost surface of one outer electrode strip and on one major surface of each inner electrode strip contains nickel hydroxide; and the electrochemically active material provided on the innermost surface of the other outer electrode strip and on the other major surface of each inner electrode strip contains zinc or cadmium oxide.

7. A system as claimed in claim 1 or claim 6 wherein at least the outer electrode strips are composed of copper foil.

* * * * *